United States Patent [19]

Watanabe et al.

[11] 4,132,747

[45] Jan. 2, 1979

[54] HEAT-RESISTANT MOLDING RESIN COMPOSITION

[75] Inventors: Tsutomu Watanabe, Yokohama; Tetsuo Aso, Tokyo, both of Japan

[73] Assignee: Sumitomo Bakelite Company Limited, Tokyo, Japan

[21] Appl. No.: 645,223

[22] Filed: Dec. 29, 1975

[30] Foreign Application Priority Data

Dec. 28, 1974 [JP] Japan .................... 49/149224

[51] Int. Cl.$^2$ ............................................ C08L 77/06
[52] U.S. Cl. ........................... 260/857 PE; 260/40 R; 260/42.18; 260/857 UN; 260/862; 260/870; 260/873; 260/876 R
[58] Field of Search .............. 260/876 R, 873, 78 UA, 260/47 UA, 857 PE, 857 UN

[56] References Cited

U.S. PATENT DOCUMENTS

| | | |
|---|---|---|
| 3,651,012 | 3/1972 | Holub et al. ..................... 260/47 UA |
| 3,717,615 | 2/1973 | Holub et al. ..................... 260/78 UA |
| 3,766,302 | 10/1973 | Holub et al. ................. 260/876 R X |
| 3,883,486 | 5/1975 | Bargain .................... 260/857 UN X |
| 3,970,714 | 7/1976 | Bargain .......................... 260/857 PE |
| 3,972,960 | 8/1976 | Bargain .......................... 260/857 PE |
| 3,985,928 | 10/1976 | Watanabe et al. ........ 260/857 PE X |
| 3,998,787 | 12/1976 | Bargain ..................... 260/857 PE X |
| 4,035,345 | 7/1977 | Ducloux et al. ......... 260/857 UN X |
| 4,039,628 | 8/1977 | Bargain .......................... 260/857 UN |
| 4,064,193 | 12/1977 | Bargain .......................... 260/857 PE |

*Primary Examiner*—Thomas DeBenedictis, Sr.
*Attorney, Agent, or Firm*—Karl W. Flocks

[57] ABSTRACT

A novel heat-resistant resin composition moldable in 20 to 180 seconds at a temperature of 130° to 180° C. and excellent in mechanical strengths at high temperatures is obtained by mixing a polyaminobismaleimide with a modifying reagent selected from the group consisting of (A) a diallyl phthalate prepolymer and (B) a mixture thereof with at least one monomer having a polymerizable double bond and 2 to 20 carbon atoms, and an organic peroxide. In this resin composition, the low mechanical strengths at high temperatures of phenolic resins and silicone resins, which are a drawback of these resins, and the unsatisfactory curability of an unmodified polyaminobismaleimide resin have been overcome. The present composition, therefore, is suitable for use in electrical parts, electronic parts, automobile parts, and machine parts.

9 Claims, No Drawings

HEAT-RESISTANT MOLDING RESIN COMPOSITION

This invention relates to an improvement in the resistance to thermal degradation and mechanical characteristics at high temperatures of thermosetting resins, and in particular, it relates to a novel heat-resistant molding resin composition excellent in mechanical characteristics at high temperatures and in curability.

Molding materials of thermosetting resins have been used conventionally in those electrical parts, electronic parts, automobile parts, and machine parts which are required to be heat-resistant. Under such severe conditions as 200° C. or higher, however, molding materials of phenolic resins, epoxy resins, and the like, are unsuitable for use, because they are inferior in thermal degradation resistance and mechanical strengths at high temperatures. Silicone resins, although known to have an excellent heat resistance, have too low mechanical strengths to be used. There have been no thermosetting molding materials suitable for use under the said temperature conditions.

Although various resins have been examined to overcome the above-noted difficulties, known resins excellent in heat resistance requires heating at a high temperature or at a high pressure for a long period of time in molding. For instance, thermosetting polyimide resin molding materials are known to have a good heat resistance and sufficient mechanical strengths at high temperatures. However, the thermosetting polyimide resin molding materials have the disadvantages that they must be molded by heating at a molding temperature of 180° to 200° C. for 10 minutes or more; that owing to insufficient rigidity at high temperatures, they tend to get warped or scratched when they are taken out of the mold; and that they have a large bulk factor owing to their powdery or fibrous form, adversely affecting commercially important molding cycles.

A polyaminobismaleimide is obtained by the addition reaction of N,N'-bismaleimide with a diamine and known as a heat-resistant thermosetting resin excellent in mechanical characteristics at high temperatures and resistance to thermal degradation. However, it is poor in curability and must be compression-molded at a temperature of at least 200° C. for a long period of time or post-treated at 200° C. or higher temperatures for a long period of time after having been molded.

In order to overcome the aforesaid difficulties, the present inventors conducted extensive research on resins, curing agents, and accelerators and, as a result, have found that a composition comprising a resin component composed of polyaminobismaleimide, a modifying reagent selected from the group consisting of (A) diallyl phthalate prepolymers and (B) a mixture of diallyl phthalate prepolymers and at least one monomer having polymerizable double bonds, and an organic peroxide, and, if necessary, a filler component is excellent in heat resistance and mechanical characteristics at high temperatures and gives desirable molded articles on molding at 130° to 180° C. for 20 to 180 seconds.

An object of this invention is to provide a thermosetting resin molding composition excellent in heat resistance and mechanical strengths at high temperatures.

Another object of this invention is to provide a thermosetting resin molding composition excellent in moldability and curability.

Other objects and advantages of this invention will become apparent from the following description.

According to this invention, there is provided a thermosetting resin molding composition resistant to heat and excellent in molding characteristics, comprising 100 parts by weight of a polyaminobismaleimide, 1 to 100, preferably 5 to 90, parts by weight of a modifying reagent selected from the group consisting of (A) diallyl phthalate prepolymers and (B) a mixture of diallyl phthalate prepolymers and at least one monomer having polymerizable double bonds and 2 to 20 carbon atoms, the amount of the diallyl phthalate prepolymer in the mixture being at least 0.5 part by weight per 100 parts by weight of polyaminobismaleimide, and the amount of the at least one monomer in the mixture being 0.5 to 50 parts by weight per 100 parts by weight of polyaminobismaleimide, and 0.1 to 10 parts by weight of an organic peroxide, and if necessary, a filler component.

If the amount of the modifying reagent exceeds 100 parts by weight per 100 parts by weight of the polyaminobismaleimide, the resulting composition is insufficient in mechanical characteristics at high temperatures and resistance to thermal degradation, and hence, is unsatisfactory in performance characteristics, while if it is used in an amount of less than 1 part by weight, the composition is not satisfactory in curability.

The modifying reagent consists of the diallyl phthalate prepolymers alone or in admixture with at least one monomer having polymerizable double bonds and 2 to 20 carbon atoms. When the modifying reagent consists of the mixture, the diallyl phthalate prepolymer should be contained in an amount of at least 0.5 parts by weight per 100 parts by weight of polyaminobismaleimide. When the amount is less than 0.5 parts by weight, the moldability of the composition is inferior. The amount of the at least one monomer in the mixture should be 0.5 to 50 parts by weight per 100 parts by weight of polyaminobismaleimide. When this amount is less than 0.5 part by weight, the moldability and curability of the composition are both inferior, and when it is more than 50 parts by weight, the heat-resistance of the composition is insufficient.

The polyaminobismaleimide used in this invention is a prepolymer obtained by the addition reaction of an N,N'-bismaleimide represented by the general formula I,

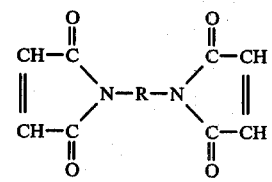

wherein R represents a divalent, aliphatic, cycloaliphatic, or aromatic group, with an aliphatic, cycloaliphatic, or aromatic diamine. The structure of said prepolymer is represented by the general formula II,

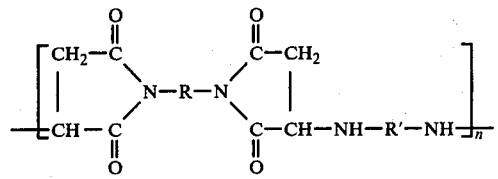

wherein R and R' represent divalent, aliphatic, cycloaliphatic, or aromatic groups and may be the same or different, and n represents a number of 1 or more, and the terminal group is in the form of

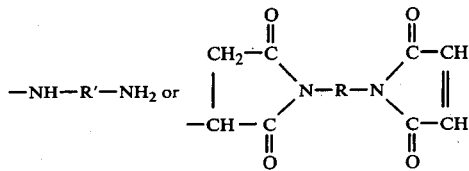

Examples of N,N'-bismaleimides represented by the general formula I are N,N'-ethylenebismaleimide, N,N'-hexamethylenebismaleimide, N,N'-decamethylenebismaleimide, N,N'-m-phenylenebismaleimide, N,N'-p-phenylenebismaleimide, N,N'-4,4'-diphenyl ether bismaleimide, N,N'-4,4'-diphenylsulfone bismaleimide, N,N'-4,4'-diphenylmethanebismaleimide, N,N'-4,4'-dicyclohexylmethanebismaleimide, N,N'-4,4'-m-xylenebismaleimide, N,N'-4,4'-diphenylcyclohexane-bismaleimide and the like. Examples of diamines to be reacted with the above-noted bismaleimides include aliphatic straight chain diamines having 2 to 20 carbon atoms such as ethylenediamine, trimethylenediamine, tetramethylenediamine, and hexamethylenediamine, and aromatic or cycloaliphatic diamines each having 6 to 30 carbon atoms such as m-phenylenediamine, p-phenylene-diamine, 4,4'-diaminodiphenylmethane, 4,4'-diaminodiphenylpropane, 4,4'-diaminodiphenyl ether, 4,4'-diaminodiphenyl sulfone, 4,4'-diaminodicyclohexane, 1,4-diaminocyclohexane, bis(4-aminophenyl)phenyl-methane, 1,5-diaminonaphthalene, m-xylyenediamine, p-xylylenediamine, and the like.

The prepolymer of an N,N'-bismaleimide and a diamine is obtained, for example, according to the method described in Japanese Patent Publication No. 42,160/72 by reacting the bismaleimide and the diamine at 50° to 250° C., preferably 50° to 170° C., for several minutes to several hours. The ratio between the bismaleimide and the diamine is preferably from 0.5 to 3 active amino hydrogen atoms per one carbon-to-carbon double bond of the bismaleimide, though not limited to this range. Although not critical, the softening point of the prepolymer formed by the addition reaction of a bismaleimide with a diamine is preperably 40° to 160° C.

The diallyl phthalate prepolymer for use in the present composition is obtained in the early stage of polymerization of a monomeric diallyl phthalate such as diallyl o-phthalate, diallyl isophthalate or the like. As is apparent from its structure, the diallyl phthalate monomer has two polymerizable double bonds in the molecule and, hence, has a functionallity of four. Accordingly, if it is allowed to polymerize freely, the polymerizate becomes insoluble and infusible due to the incident crosslinking, and hence, becomes unmoldable. When the polymerization is terminated just before the gel point is reached, there is obtained a relatively linear polymer having polymerizable double bonds and a molecular weight of 6,000 to 25,000, which polymer is hereinafter referred to as diallyl phthalate prepolymer.

The monomers having polymerizable double bonds and 2 to 20, preferably 2 to 15, carbon atoms for use together with the diallyl phthalate prepolymer in the present composition are those having at least two double bonds in the molecule such as divinylbenzene, diallyl o-phthalate, diallyl isophthalate, triallylisocyanurate, and triallyl cyanurate, or those having one double bond in the molecule such as styrene, acrylamide, acrylonitrile, methyl methacrylate, methyl vinyl ketone, vinyl chloride, methyl vinyl sulfone, vinyloxazole, and the like.

The organic peroxides to be used in the present composition include tert-butyl peroxybenzoate, cumene hydroperoxide, dicumyl peroxide, tert-butyl peroxyacetate, benzoyl peroxide, acetyl peroxide, and the like.

When it is intended to impart an especially good heat resistance and curability to the composition, the present invention is practised in such a manner that, for example, 20 to 75 parts by weight of a resin component composed of 100 parts by weight of a polyaminobismaleimide, 1 to 100 parts by weight of a modifying reagent selected from the group consisting of (A) diallyl phthalate prepolymers and (B) a mixture of diallyl phthalate prepolymers and at least one monomer having polymerizable double bonds and 2 to 20 carbon atoms, and 0.1 to 10 parts by weight of an organic peroxide is dry-blended or melt-blended with 80 to 25 parts by weight of a filler component by means of such an equipment as a mixing roll or a Ko-kneader and the resulting mixture is then ground to obtain a molding resin composition. The filler component comprises at least one filler and optinally 0.1 to 5.0% by weight of a releasing agent, 0.1 to 5.0% by weight of a pigment, and suitable amounts of other additives such as a flame retardant, etc. (the percentages are based on the weight of the filler component).

The molding composition thus obtained can be molded by customary molding methods such as transfer molding and compression molding under conditions similar to those for phenolic resin molding materials and epoxy resin molding materials (e.g. at 130° to 180° C. for 20 to 180 seconds).

The characteristics of the molded article thus obtained are further improved by heat treatment at 150° C. or higher temperatures for a period of 1 to 50 hours, and the thus treated article retains at 150° to 200° C. mechanical strengths as high as 70% or more of the initial values. Even when heat-treated at 200° to 250° C. for a period of 500 to 1,000 hours, the molded article showed little deterioration in characteristics, retaining 60% or more of the initial values.

The present composition can be made usable in a wide field by selecting suitable fillers as the filler component. The composition filled with powdered inorganic substances as the filler such as, for example, silica and alumina has a high insulation resistance at high temperature or after heat treatment and can be used as a material for electrical parts and automobile parts fitted with inserts; the composition filled with carbon fiber as the filler can be used as a material for those machine parts and sliding parts which operate at a high speed under a high load, and for highly heat-resistant parts in aircrafts and spacecrafts. A heat-resistant laminate can be manufactured by impregnating a glassfiber cloth with the present resin composition.

The invention is further explained below referring to Examples, which are not by way of limitation but by way of illustration. In the Examples, parts and percent are by weight unless otherwise specified.

Examples 1 to 3 and Comparative Example 1

A polyaminobismaleimide obtained by heating and melting together 1 mole of N,N'-4,4'-diphenylmethanebismaleimide and 1 mole of 4,4'-diaminodiphenylmethane at 150° C. for 30 minutes, was thoroughly mixed with a diallyl phthalate prepolymer having a molecular weight of 10,000, diallyl phthalate, tert-butul perbenzoate, glass fiber, powdered silica, zinc stearate, and carbon black in the proportions as shown in Table 1. The resulting mixture was melt-mixed by means of a hot mixing roll at 110° C. for 10 minutes. The resulting sheet was cooled and then pulverized by means of an impact pulverizer.

Table 1

| Example No. Ingredient | Comparative Example 1 | Ex. 1 | Ex. 2 | Ex. 3 |
|---|---|---|---|---|
| Polyaminobismaleimide (parts) | 100 | 100 | 100 | 100 |
| Diallyl phthalate prepolymer (parts) | 0 | 23 | 3 | 68 |
| Diallyl phthalate (parts) | 0 | 0 | 20 | 20 |
| tert-Butyl perbenzoate (parts) | 0 | 2 | 2 | 6 |
| Glass fiber (parts) | 114 | 143 | 143 | 250 |
| Powdered silica (parts) | 66 | 82 | 82 | 145 |
| Zinc stearate (parts) | 4 | 5 | 5 | 9 |
| Carbon black (parts) | 3 | 4 | 4 | 6 |

The present compositions of Examples 1, 2 and 3 were readily moldable at 160° C. in 2 minutes by transfer or compression molding, whereas the composition of Comparative Example 1 could by no means be molded at 160° C. in 2 minutes and it was necessary to heat the same at 200° C. for 10 minutes or more to yield a satisfactory molded article. Mechanical characteristics at high temperatures of these molded articles were as shown in Table 2.

Table 2

| Item of test | Unit | Test conditions | Comparative Example 1 | Example 1 | Example 2 | Example 3 |
|---|---|---|---|---|---|---|
| Curability | | | | | | |
| Gel time | min. | Hot plate, 160° C. | 11 | 0.8 | 0.6 | 0.6 |
| Barcol hardness | *2 | Molded at 160° C. for 2 min. | Unmoldable | 24 | 49 | 53 |
| Characteristics of molded specimen: | | | | | | |
| Molding temperature | ° C. | — | 200 | 160 | 160 | 160 |
| Molding time | min. | — | 10 | 2 | 2 | 2 |
| Flexural strength *1 Without heat treatment | kg/mm² | Tested at room temp. | 6.3 | 10.2 | 10.9 | 10.0 |
| | | Tested at 200° C. | 3.4 | 7.3 | 7.2 | 7.3 |
| After heat treatment at 200° C. for 24 hours | kg/mm² | Tested at room temp. | 9.8 | 10.8 | 12.1 | 11.3 |
| | | Tested at 200° C | 7.4 | 7.6 | 7.9 | 8.1 |
| Modulus of elasticity in flexure | kg/mm² | Tested at room temp. | 1210 | 1405 | 1320 | 1350 |
| " | kg/mm² | Tested at 200° C | 360 | 940 | 930 | 930 |

Note:-
*1 Flexural test was carried out according to JIS K 6911.
*2 Tested 10 seconds after removal from the mold (Barcol impressor No. 936 of Barber Colmon Co. was used).

The present compositions of Examples 1, 2, and 3 were excellent in moldability and yielded molded articles with excellent characteristics at room temperature and high temperatures.

EXAMPLES 4, 5, AND 6

A polyaminobismaleimide obtained by reacting in molten state at 160° C. for 30 minutes 1 mole of N,N'-4,4'-diphenylmethanebismaleimide and 1.5 moles of 4,4'-diaminodiphenylmethane was mixed in a mixer at 120° C. for 10 minutes with diallyl phthalate prepolymer having a molecular weight of 15,000, styrene or triallyl isocyanurate, dicumyl peroxide, powdered silica, stearic acid, and carbon black in the proportions as shown in Table 3. The resulting granular compositions yielded satisfactory molded articles on molding at 170° C. for one minute.

Table 3

| Ingredient | | Ex. 4 | Ex. 5 | Ex. 6 |
|---|---|---|---|---|
| Polyaminobismaleimide | (parts) | 100 | 100 | 100 |
| Diallyl phthalate prepolymer | (Parts) | 40 | 10 | 20 |
| Styrene | (parts) | 26 | 33 | 0 |
| Triallyl isocyanurate | (parts) | 0 | 0 | 40 |
| Dicumyl peroxide | (parts) | 4 | 3 | 5 |
| Powdered silica | (parts) | 210 | 188 | 240 |
| Stearic acid | (parts) | 5 | 5 | 6 |
| Carbon black | (parts) | 5 | 5 | 6 |

The molded articles obtained by molding the granular compositions of Examples 4, 5, and 6 at 170° C. for 5 minutes retained 70% or more of the initial flexural strengths even at 200° C.

EXAMPLE 7

By using a mixing roll heated at 120° C., the polyaminobismaleimide used in Examples 1, 2, and 3 was mixed in the molten state with a diallyl phthalate prepolymer having a molecular weight of 10,000, tert-butyl peroxyacetate, carbon fiber, and zinc stearate in the proportions as shown in Table 4 and then pulverized. The resulting composition was and then pulverized. The resulting composition was easily moldable at 160° C. in 2 minutes.

Table 4

| Ingredient | Parts |
|---|---|
| Polyaminobismaleimide | 100.0 |
| Diallyl phthalate prepolymer | 60.0 |
| tert-Butyl peroxyacetate | 2.0 |
| Carbon fiber | 150.0 |
| Zinc stearate | 3.5 |

The molded specimen obtained by molding the composition at 160° C. for 2 minutes was heat-treated at 250°

C. for 500 hours without showing any change in appearance. The thus heat-treated specimen also retained 80% or more of the initial flexural strength, indicating excellent resistance to heat and thermal degradation.

Further, the molded specimen was tested for frictional abrasion characteristics (by use of an abrasion tester, Model EFM 3 of Toyo Sokki Co.) under the following conditions: 30 kg/cm² load, 1.0 m/sec. speed, 10 hours rubbing. The abrasion loss was found to be half or less as compared with a phenolic or epoxy resin molding material filled with carbon fiber, indicating that the present composition of this Example retained excellent characteristics after having been subjected to abrasive action under a high load at a high speed.

EXAMPLES 8 to 12

Various bismaleimides and diamines were melted at 150° C. for 30 min. to obtain various polyaminobismaleimides. Thereto were added various polymerizable monomers and diallyl phthalate prepolymer having a molecular weight of 18,000, and cumene hydroperoxide in the proportions shown in Table 5, and the resulting mixtures were mixed at 120° C. for 10 min. by means of a mixer to obtain compositions consisting of only resin component.

With respect of the curability of the composition, the gel time on a hot plate at 160° C. and the Barcol hardness just after molding are shown in Table 5, and with respect of the heat resistance of the molded articles, the heat distortion temperature and the retaining percentage of flexural strength of the molded article at 200° C. based on that at room temperature and the retaining percentage of the flexural strength of the molded article after treatment at 200° C. for 72 hours measured at room temperature based on the flexural strength of the molded article before said treatment are shown in Table 5.

Table 5

| Example No. Composition and characteristics | 8 | 9 | 10 | 11 | 12 |
|---|---|---|---|---|---|
| N,N'-bismaleimide | N,N'-m-phenylene-bismaleiamide | N,N'-hexamethylene bismaleiamide | N,N'-decamethylene-bis-maleiamide | N,N'-diphenyl ether-bis-maleiamide | N,N'-dicyclohexyl-methane-bis-maleiamide |
| Diamine | Tetramethylene diamine | 4,4'-Diaminodiphenyl-propane | 4,4'-Diaminodiphenyl-sulfone | 1,4-Diaminocyclohexane | p-Xylene-diamine |
| Molar ratio of -NH of diamine/-C=C- of bismaleimide | 1.0 | 2.0 | 2.5 | 1.2 | 1.7 |
| Polymerizable monomer | Acrylonitrile | Methyl vinyl ketone | Methyl vinyl sulfone | Methyl methacrylate | Vinyl oxazole |
| Amount (parts per 100 parts of polyaminobisimide) | 30 | 30 | 50 | 5 | 15 |
| Diallyl phthalate propolymer (parts per 100 parts of polyaminobisimide) | 20 | 50 | 50 | 20 | 20 |
| Cumene hydroperoxide (parts per 100 parts of polyaminobisimide) | 4 | 5 | 6 | 2 | 3 |
| Gel time at 160° C (min.) | 1.2 | 1.5 | 1.7 | 0.6 | 1.0 |
| Barcol hardness (molded at 160° C for 3 min.) | 20 | 15 | 22 | 40 | 18 |
| Heat distortion temperature (0° C) | 242 | 232 | 245 | 247 | 250 |
| Retaining percentage of flexural strength at 200 C (%) | 78 | 75 | 82 | 86 | 83 |
| Retaining percentage of flexural strength after treatment at 200° C for 72 hrs. (%) (measured at room temperature) | 82 | 80 | 84 | 91 | 85 |

EXAMPLE 13

One mole of N,N'-4,4'-diphenylmethane bismaleimide and one mole of 4,4'-diaminodiphenyl ether were melted at 150° C. for 30 min. to obtain polyaminobismaleimide. 100 parts of this polyaminobismaleimide, 10 parts of a diallyl phthalate prepolymer having a molecular weight of 8,000, 20 parts of triallyl isocyanurate, and 2 parts of dicumyl peroxide were dissolved in N-methyl pyrrolidone to obtain a 30% concentration varnish. With this varnish was impregnated a glass cloth treated with γ-glycidoxypropyltrimethoxysilane and having a thickness of 0.18 mm, and then dried at 150° C. for 20 min. to obtain a prepreg having a resin content of 45%.

Eleven sheets of the thus obtained prepreg were placed one on another, and the resulting assembly was pressed by means of a hot press at 170° C. at 50 kg/cm² for 3 hours to obtain a glass cloth laminate having a thickness of 2 mm.

The flexural strength of the laminate was as follows, and thus, the laminate was very excellent in characteristics at high temperatures and characteristics after heat treatment:

| Measurement temperature | 25° C | 200° C |
|---|---|---|
| Initial value | 56 kg/cm² | 49 kg/cm² |
| After heat treatment at 200° C for 1,000 hours | 43 kg/cm² | 38 kg/cm² |
| After heat treatment at 250° C for 1,000 hours | 37 kg/cm² | 32 kg/cm² |

What is claimed is:

1. A thermosetting molding resin composition for producing heat-resistant bodies consisting essentially of 100 parts by weight of a polyaminobismaleimide prepolymer which is the reaction product of a bisimide and a diamine;

1 to 100 parts by weight of a modifying reagent selected from the group consisting of (A) diallyl phthalate prepolymers having a weight average molecular weight of 6000–25000 and (B) a mixture of diallyl phthalate prepolymers having a weight average molecular weight of 6000–25000 and at least one monomer having polymerizable double bonds and 2 to 20 carbon atoms, the amount of the diallyl phthalate prepolymers in the mixture being at least 0.5 part by weight per 100 parts by weight of polyaminobismaleimide and the amount of the at least one monomer in the mixture being 0.5 to 50 parts by weight per 100 parts by weight of polyaminobismaleimide, and 0.1 to 10 parts by weight of an organic peroxide.

2. A molding resin composition according to claim 1, wherein the polyaminobismaleimide is a prepolymer obtained by the addition reaction between an N,N'-bismaleimide and a diamine and having a structure represented by the general formula,

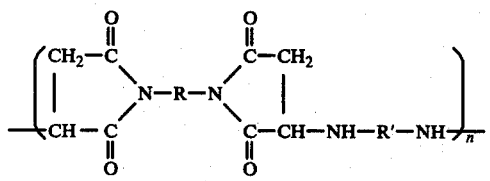

wherein R and R' represent divalent aliphatic, cycloaliphatic, or aromatic groups and may be the same or different, and n represents a number of 1 or more, and the terminal group is in the form of

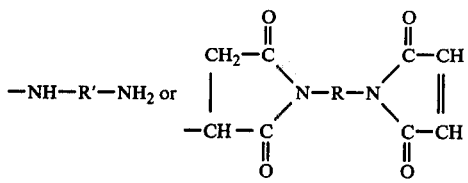

3. A molding resin composition according to claim 1, wherein the diallyl phthalate prepolymer is a prepolymer obtained in the early stage of polymerization of a diallyl phthalate monomer selected from the group consisting of diallyl o-phthalate and diallyl isophthalate.

4. A molding resin composition according to claim 1, wherein the monomer having polymerizable double bonds is a monomer having at least 2 polymerizable double bonds in the molecule.

5. A molding resin composition according to claim 1, wherein the monomer having polymerizable double bonds is selected from the group consisting of styrene, acrylamide, acrylonitrile, methyl methacrylate, methyl vinyl ketone, vinyl chloride, vinyloxazole, and methyl vinyl sulfone.

6. A molding resin composition according to claim 1, wherein the organic peroxide is at least one peroxide selected from the group consisting of tert-butyl peroxylbenzoate, cumene hydroperoxide, dicumyl peroxide, tert-butyl peroxyacetate, benzoyl peroxide, and acetyl peroxide.

7. A molding composition according to claim 1, further containing 80 to 25 parts by weight of a filler component per 20 to 75 parts by weight of the resin component consisting of the polyaminobismaleimide, a modifying reagent selected from the group consisting of the (A) and (B) ingredients, and the organic peroxide.

8. A molding resin composition according to claim 2, wherein the ratio between the N,N'-bismaleimide and the diamine is 0.5 to 3 active amino hydrogen atoms per one carbon-to-carbon double bond in the N,N'-bismaleimide.

9. A molding resin composition according to claim 4, wherein the monomer having at least 2 polymerizable double bonds is selected from the group consisting of diallyl o-phthalate, diallyl isophthalate and triallyl isocyanurate.

* * * * *